United States Patent
Sodagar

(10) Patent No.: US 11,418,561 B2
(45) Date of Patent: Aug. 16, 2022

(54) REMOTE LINK VALIDITY INTERVAL IN MEDIA STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/095,097

(22) Filed: Nov. 11, 2020

(65) Prior Publication Data

US 2021/0281621 A1 Sep. 9, 2021

Related U.S. Application Data

(60) Provisional application No. 62/984,470, filed on Mar. 3, 2020.

(51) Int. Cl.
*H04L 65/612* (2022.01)
*H04N 21/44* (2011.01)
*H04L 67/02* (2022.01)
*H04L 65/60* (2022.01)

(52) U.S. Cl.
CPC ........ *H04L 65/4084* (2013.01); *H04L 65/602* (2013.01); *H04L 67/02* (2013.01); *H04N 21/44004* (2013.01)

(58) Field of Classification Search
CPC ... H04L 65/4084; H04L 67/02; H04L 65/602; H04L 65/608; H04N 21/812; H04N 21/44004; H04N 21/26258; H04N 21/4425; H04N 21/6581; H04N 21/6587
See application file for complete search history.

(56) References Cited

U.S. PATENT DOCUMENTS

| | | | | |
|---|---|---|---|---|
| 11,012,761 | B1 * | 5/2021 | Fay | H04H 60/15 |
| 2015/0019629 | A1 * | 1/2015 | Giladi | H04N 21/26258 709/203 |
| 2018/0035139 | A1 * | 2/2018 | Giladi | H04N 21/2355 |
| 2020/0275148 | A1 * | 8/2020 | Stockhammer | H04N 21/26241 |

FOREIGN PATENT DOCUMENTS

WO WO-2017007230 A1 * 1/2017 ........... H04N 21/236

OTHER PUBLICATIONS

Information technology—Dynamic adaptive streaming over HTTP (DASH)—Part 1: Media presentation description and segment formats, MPEG2019/m52458, Brussels, BE, Jan. 2020 (286 pages).

* cited by examiner

*Primary Examiner* — Caroline H Jahnige
(74) *Attorney, Agent, or Firm* — ArentFox Schiff LLP

(57) ABSTRACT

Aspects of the disclosure provide methods, apparatuses, and non-transitory computer-readable mediums for receiving media content. An apparatus includes processing circuitry that receives a media presentation description (MPD) file. The MPD file indicates a validity period in which a resolution of a remote element of the MPD file is valid. The processing circuitry determines whether the remote element has been resolved during the validity period indicated by the MPD file based on a media presentation being determined to be within the validity period. The processing circuitry resolves the remote element of the MPD file based on the remote element being determined not to be resolved in the validity period. The processing circuitry outputs media content corresponding to the same resolved remote element in the validity period for each reference to the remote element in the MPD during the validity period.

20 Claims, 7 Drawing Sheets

REMOTE LINK VALIDITY INTERVAL IN MEDIA STREAMING

INCORPORATION BY REFERENCE

This present application claims the benefit of priority to U.S. Provisional Application No. 62/984,470, "REMOTE LINK VALIDITY INTERVAL IN MEDIA STREAMING" filed on Mar. 3, 2020, which is incorporated by reference herein in its entirety.

TECHNICAL FIELD

The present disclosure describes embodiments generally related to resolving remote elements of media presentation description (MPD) in dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture experts group (MPEG) uses extensible markup language linking language (XLink) element(s) (e.g., an XLink link) in media presentation description (MPD) for a remote element in dynamic adaptive streaming over hypertext transfer protocol (DASH) standardization. During a playback of media content, the XLink element(s) in the MPD needs to be resolved before a timeline of the remote element is built. However, an actuate attribute (e.g., an onRequest mode) of the XLink element(s) requires the XLink element(s) to be resolved just before the playback of the media content. This requirement is ambiguous and can result in an inconsistent playback of the media content for various players such as a player that randomly accesses or replays the remote element.

SUMMARY

Aspects of the disclosure provide apparatuses for receiving media content. One apparatus includes processing circuitry that receives a media presentation description (MPD) file that indicates a validity period in which a resolution of a remote element of the MPD file is valid. The processing circuitry determines whether the remote element has been resolved during the validity period indicated by the MPD file based on a media presentation being determined to be within the validity period. The processing circuitry resolves the remote element of the MPD file based on the remote element being determined not to be resolved in the validity period. The processing circuitry outputs media content corresponding to the same resolved remote element in the validity period for each reference to the remote element in the MPD during the validity period.

In an embodiment, the MPD file includes a first parameter indicating a start time of the validity period and a second parameter indicating a duration of the validity period.

In an embodiment, the first parameter is an offset between the start time of the validity period and a start time of the media content corresponding to the resolved remote element.

In an embodiment, the first parameter and the second parameter are included in one of a period element, an essential property descriptor, and a supplemental property descriptor included in the MPD file.

In an embodiment, the processing circuitry determines whether the remote element has been resolved during the validity period based on a hyperlink included in the MPD file corresponding to the remote element.

In an embodiment, the hyperlink is an extensible markup language linking language (XLink) link.

In an embodiment, a timeline of the validity period is a timeline of the MPD file.

Aspects of the disclosure provide methods for receiving media content. In one method, an MPD file that indicates a validity period in which a resolution of a remote element of the MPD file is valid is received. Whether the remote element has been resolved during the validity period indicated by the MPD file is determined based on a media presentation being determined to be within the validity period. The remote element of the MPD file is resolved based on the remote element being determined not to be resolved in the validity period. Media content corresponding to the same resolved remote element is output in the validity period for each reference to the remote element in the MPD during the validity period.

Aspects of the disclosure also provide non-transitory computer-readable mediums storing instructions which when executed by a computer for receiving media content cause the computer to perform any one or a combination of the methods for receiving the media content.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
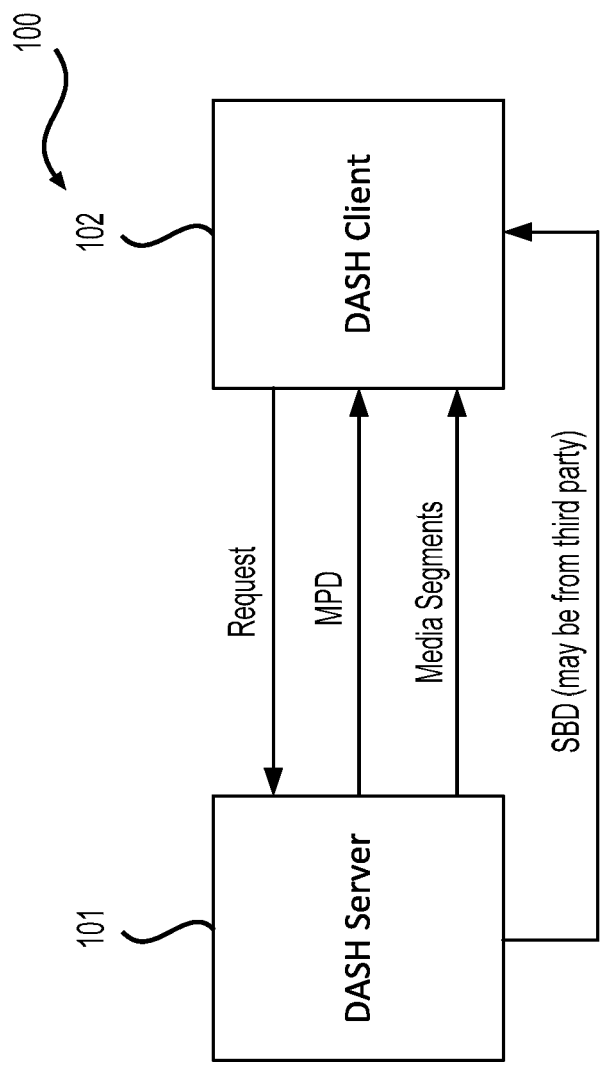
FIG. 1 shows an exemplary session-based dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, such that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, Moving Picture Expert Group (MPEG) provides session-based DASH operations. In session-based DASH operations, the DASH client can receive a side file, such as a session-based description (SBD) file, which provides instructions for the DASH client to customize the MPD file per a session and possibly per a client.

FIG. 1 shows an exemplary session-based DASH system (100) according to an embodiment of the disclosure. In the session-based DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. In addition, the DASH client (102) can receive an SBD file from the DASH server (101) or a third party (e.g., session controller).

It is noted that multiple DASH servers can send MPD file and media segments, so the MPD file and the media segments can be sent to the DASH client (102) from different DASH servers. In addition, a DASH server receiving the request sent from the DASH client (102) can be different from a DASH server sending the media segments.

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
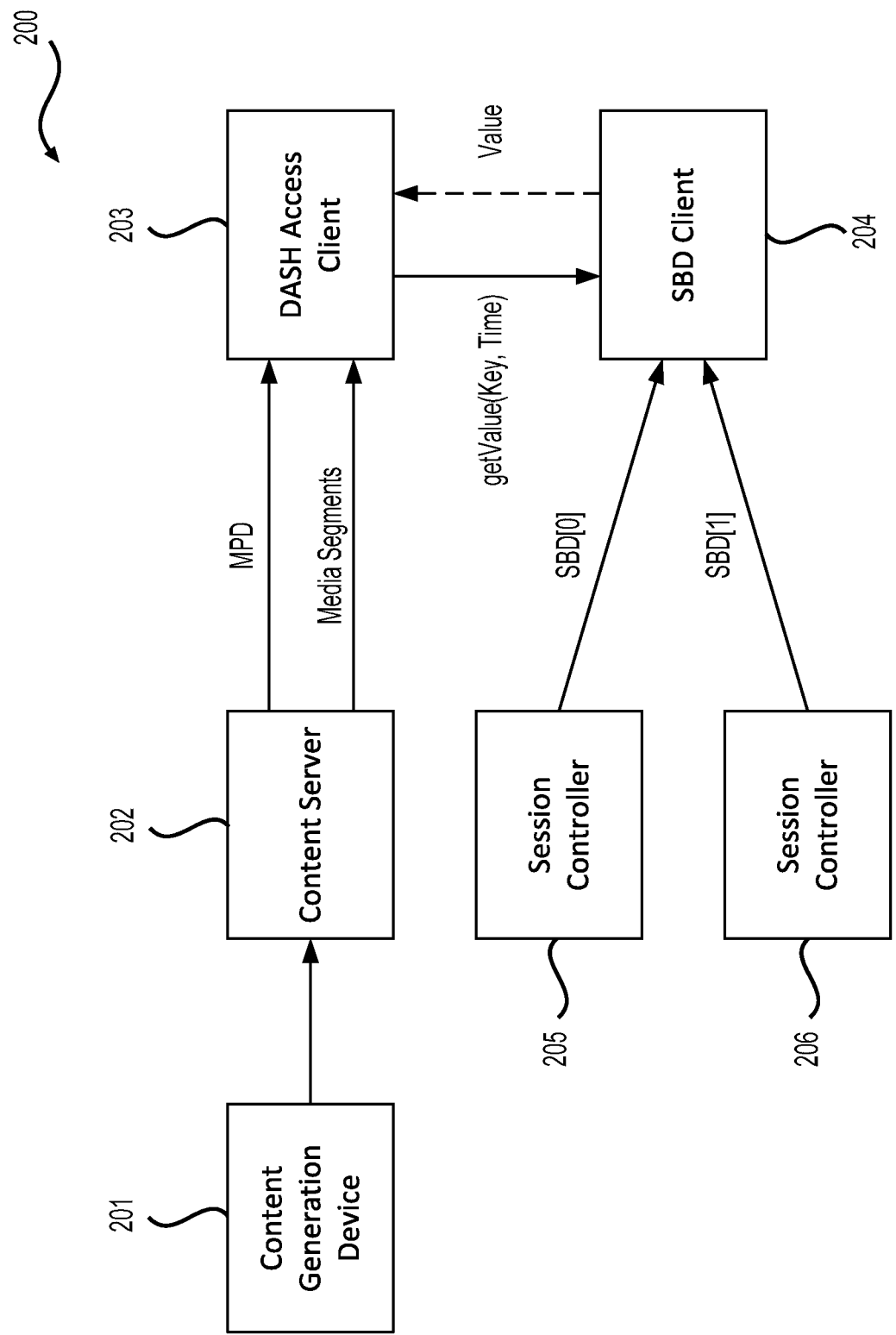
FIG. 2 shows another exemplary session-based DASH system according to an embodiment of the disclosure.

FIG. 2 shows another exemplary session-based DASH system (200) according to an embodiment of the disclosure. In the session-based DASH system (200), multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

III. DASH Client Architecture

Figure 3:
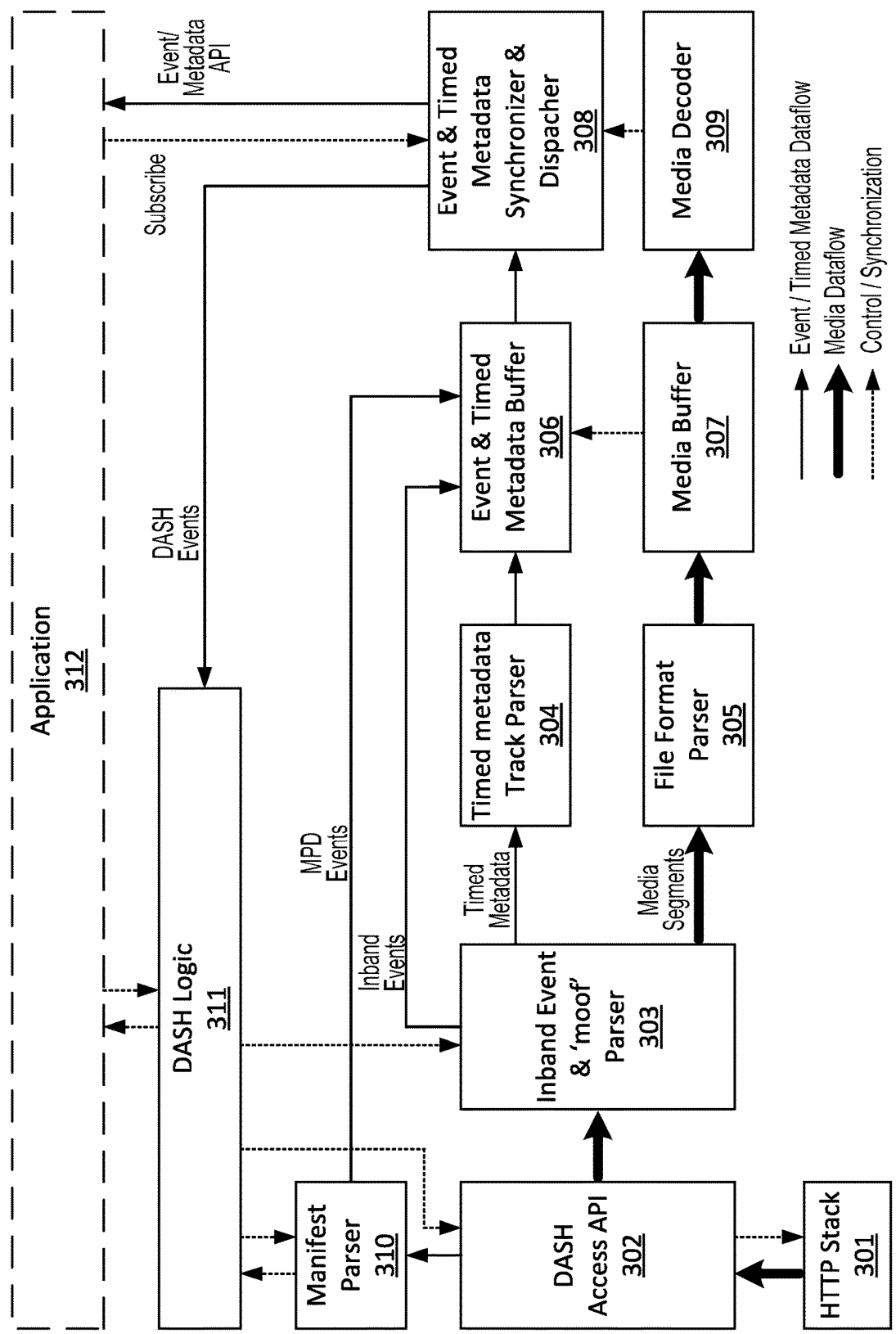
FIG. 3 shows an exemplary DASH client architecture according to an embodiment of the disclosure.

FIG. 3 shows an exemplary DASH client architecture according to an embodiment of the disclosure. A DASH client (or DASH player) such as the DASH client (102) can be configured to communicate with an application (312) and process various types of events, including (i) MPD events, (ii) inband events, and (iii) timed metadata events.

A manifest parser (310) can parse a manifest (e.g., an MPD). The manifest can be provided by the DASH server (101) for example. The manifest parser (310) can extract event information about MPD events, inband events, and timed metadata events embedded in timed metadata tracks. The extracted event information can be provided to a DASH logic (311) (e.g., DASH player control, selection, and heuristic logic). The DASH logic (311) can notify the application (312) of event schemes signaled in the manifest based on the event information.

The event information can include event scheme information for distinguishing between different event streams. The application (312) can use the event scheme information to subscribe to event schemes of interest. The application (312) can further indicate a desired dispatch mode for each of the subscribed schemes through one or more subscription application programming interfaces (APIs). For example, the application (312) can send a subscription request to the DASH client that identifies one or more event schemes of interest and any desired corresponding dispatch modes.

If the application (312) subscribes to one or more event schemes that are delivered as part of one or more timed metadata tracks, an inband event and 'moof' parser (303) can stream the one or more timed metadata tracks to a timed metadata track parser (304). For example, the inband event and 'moof' parser (303) parses a movie fragment box ("moof") and subsequently parses the timed metadata track based on control information from the DASH logic (311).

The timed metadata track parser (304) can extract event messages embedded in the timed metadata track. The extracted event messages can be stored in an event and timed metadata buffer (306). A synchronizer/dispatcher module (308) (e.g., event and timed metadata synchronizer and dispatcher) can dispatch (or send) the subscribed events to the application (312).

MPD events described in the MPD can be parsed by the manifest parser (310) and stored in the event and timed metadata buffer (306). For example, the manifest parser (310) parses each event stream element of the MPD, and parses each event described in each event stream element. For each event signaled in the MPD, event information such as presentation time and event duration can be stored in the event and timed metadata buffer (306) in association with the event.

The inband event and 'moof' parser (303) can parse media segments to extract inband event messages. Any such identified inband events and associated presentation times and durations can be stored in the event and timed metadata buffer (306).

Accordingly, the event and timed metadata buffer (306) can store therein MPD events, inband events, and/or timed metadata events. The event and timed metadata buffer (306) can be a First-In-First-Out (FIFO) buffer, for example. The event and timed metadata buffer (306) can be managed in correspondence with a media buffer (307). For example, as long as a media segment exists in the media buffer (307), any events or timed metadata corresponding to that media segment can be stored in the event and timed metadata buffer (306).

A DASH Access API (302) can manage the fetching and reception of a content stream (or dataflow) including media content and various metadata through an HTTP protocol stack (301). The DASH Access API (302) can separate the received content stream into different dataflows. The dataflow provided to the inband event and 'moof' parser (303) can include media segments, one or more timed metadata tracks, and inband event signaling included in the media segments. In an embodiment, the dataflow provided to the manifest parser (310) can include an MPD.

The DASH Access API (302) can forward the manifest to the manifest parser (310). Beyond describing events, the manifest can also provide information on media segments to the DASH logic (311), which can communicate with the application (312) and the inband event and 'moof' parser (303). The application (312) can be associated with the media content processed by the DASH client. Control/synchronization signals exchanged among the application (312), the DASH logic (311), the manifest parser (310), and the DASH Access API (202) can control the fetching of media segments from the HTTP Stack (301) based on information regarding media segments provided in the manifest.

The inband event and 'moof' parser (303) can parse a media dataflow into media segments including media content, timed metadata in a timed metadata track, and any signaled inband events in the media segments. The media segments including media content can be parsed by a file format parser (305) and stored in the media buffer (307).

The events stored in the event and timed metadata buffer (306) can allow the synchronizer/dispatcher (308) to communicate to the application (312) the available events (or events of interest) related to the application (312) through an event/metadata API. The application (312) can be configured to process the available events (e.g., MPD events, inband events, or timed metadata events) and subscribe to particular events or timed metadata by notifying the synchronizer/dispatcher (308). Any events stored in the event and timed metadata buffer (306) that are not related to the application (312), but are instead related to the DASH client itself can be forwarded by the synchronizer/dispatcher (308) to the DASH logic (311) for further processing.

In response to the application (312) subscribing to particular events, the synchronizer/dispatcher (308) can communicate to the application (312) event instances (or timed metadata samples) corresponding to event schemes to which the application (312) has subscribed. The event instances can be communicated in accordance with a dispatch mode indicated by the subscription request (e.g., for a specific event scheme) or a default dispatch mode. For example, in an on-receive dispatch mode, event instances may be sent to the application (312) upon receipt in the event and timed metadata buffer (306). On the other hand, in an on-start dispatch mode, event instances may be sent to the application (312) at their associated presentation time, for example in synchronization with timing signals from the media decoder (309).

IV. Remote Element in DASH

Target-based media content tailoring is a popular and important feature in media streaming. This feature can allow a client (or a media player) to play media content based on one or more factors, such as the preference, location, age, and interest of the client as well as other factors. Thus, each client can have a different media content. Target-based advertising is an important use-case in this regard. The target-based media content tailoring at a client side can be achieved by remote elements (or remote resources) in media streaming protocols such as DASH and other streaming protocols. A remote element can be an element (e.g., a period element) that is not explicitly defined in a manifest (e.g., MPD) that is processed by the client. Instead, a link corresponding to the remote element can be provided in the manifest. Through the link, the client can obtain a remote element resolution. Then, the client can replace the remote element with the remote element resolution and play back the media content corresponding to the remote element based on the remote element resolution.

In some related examples such as DASH, extensible markup language (XML) linking language (XLink) can be used for the remote element. XLink can allow elements (e.g., an XLink link) to be inserted into XML documents in order to create and describe links between resources. A resource can be an addressable unit of information or service. Examples include files, images, documents, programs, and query results. The means used for addressing a resource can be an internationalized resource identifier (IRI) reference. Using an)(Link link can be referred to as traversal that can involve a pair of resources: a starting resource and an ending resource. The starting resource is an origin for the traversal. The ending resource is a destination for the traversal. By resolving the XLink link, a client can obtain a remote element resolution that is a traversal from the starting resource to the ending resource.

A remote element using)(Link can include two attributes, @xhnk:href and @xhnk:actuate. The attribute @xhnk:href can include a URL pointing to a complete description of the remote element, and the attribute @xhnk:actuate can specify a resolution model (e.g., onLoad or onRequest) of the remote element. Table 1 shows a remote element and a corresponding remote element resolution. The remote element is one period element, which is resolved into two period elements.

TABLE 1

| Remote Element | <Period xlink:href="http://test" xlink:actuate="onLoad"/> |
|---|---|
| Remote Element Resolution | <?xml version="1.0" encoding="utf-8"?><br><Period id=0>...</Period><br><Period id=1>...</Period> |

According to aspects of the disclosure, an actuate attribute of an XLink link can be used for a remote element to communicate a desired timing of a resolution of the remote element. The actuate attribute of the XLink link can include an onLoad mode and an onRequest mode.

In the onLoad mode, before the playback of the media content, the remote element needs to be resolved. Once the remote element is resolved, the entire media content can be played, such that an application or a client can traverse to the ending resource immediately on loading the starting resource. For example, in the onLoad mode, the remote element resolution may not be the latest resolution. That is, after the remote element is resolved, for each reference to the remote element, the target-based media content tailoring such as the target-based advertising may not be updated and can be the same as a previous target-based advertising.

In the onRequest mode, the remote element can be resolved a few moments before the media content corresponding to the remote element needs to be played. This allows further target-based media content tailoring depending on the moment of the playback. Accordingly, the remote element resolution can be the latest resolution. That is, even if the remote element was previously resolved, the remote element may need to be resolved again for each reference to the remote element, such that the target-based media content (e.g., target-based advertising) can be updated and may not be the same as the previous target-based advertising. For example, an application or a client can traverse from the starting resource to the ending resource on a post-loading event triggered for the purpose of traversal. An example of such an event is when a user clicks on the presentation of the starting resource, or a software module finishes a countdown that precedes a redirect.

However, since the manifest can be updated in some applications such as DASH, the validity of the remote element resolution in the onRequest mode may not be clear. In some related examples, this ambiguous validity can result in an inconsistent playback of the media content, depending on a player implementation and/or the manifest.

V. Validity Interval for Remote Element Resolution

This disclosure introduces a validity interval (or period) for the remote element resolution. This interval can define a period during which the remote element resolution can be valid. Therefore, the client can know when the earliest time to resolve the remote element is and does not try to resolve the remote element earlier than the earliest time. In addition, after resolving the remote element, the client can know how long the resolved remote element is valid. Accordingly, in order to avoid the inconsistency of the playback, the client does not need to resolve the remote element again during the validity interval. The client can also play back the same content if the client comes back to the same point during the validity interval.

Figure 4:
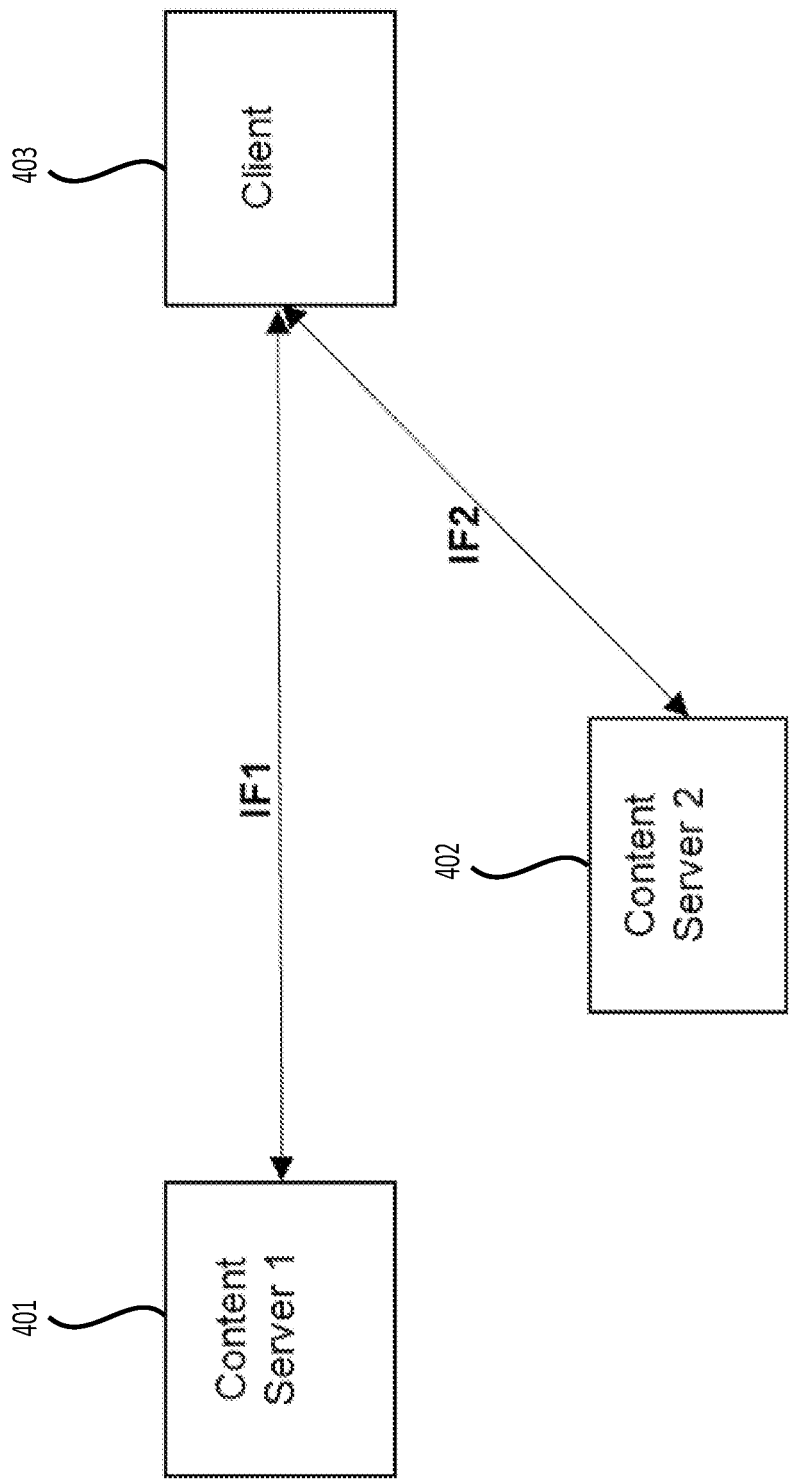
FIG. 4 shows an exemplary streaming architecture according to an embodiment of the disclosure.

FIG. 4 shows an exemplary streaming architecture according to an embodiment of the disclosure. The streaming architecture includes two content servers (401)-(402) and a client (403). Interfaces between the two content servers (401)-(402) and the client (403) can be represented by IF1 and IF2, respectively. It is assumed that the content server (401) can provide the client (403) a manifest for playing back the target-based media content. In an embodiment, the manifest can include three periods P1, P2, and P3. Specifically, P1 and P3 can be explicit periods in which the corresponding media content can reside in the content server (401), and P2 can be a remote period in which the corresponding media content can be defined by an XLink link (P2 link) pointing to the content server (402).

In some related examples, when the client (403) parses the manifest, the client (403) may need to resolve the P2 link that points to the content server (402). But the client (403) may not know an exact timing to resolve the P2 link. In addition, when the manifest such as an MPD is updated, whether the P2 link is to be resolved again may not be clear to the client (403).

In order to provide a consistent playback of the media content, two parameters, validity start time (VST) and validity duration (VD), can be included in a hyperlink such as the XLink link for the remote element. The VST parameter is a start time in a media presentation timeline at which the resolution of the remote element can result in a valid explicit element. The VD parameter is a duration in which the resolution of the remote element can stay valid. Accordingly, these two properties can define a lifetime (or a lifespan) for the remote element resolution. If a current media presentation time is outside the lifetime of the remote element resolution, the remote element resolution can be considered to be expired. Otherwise, the element resolution can be used.

Figure 5:
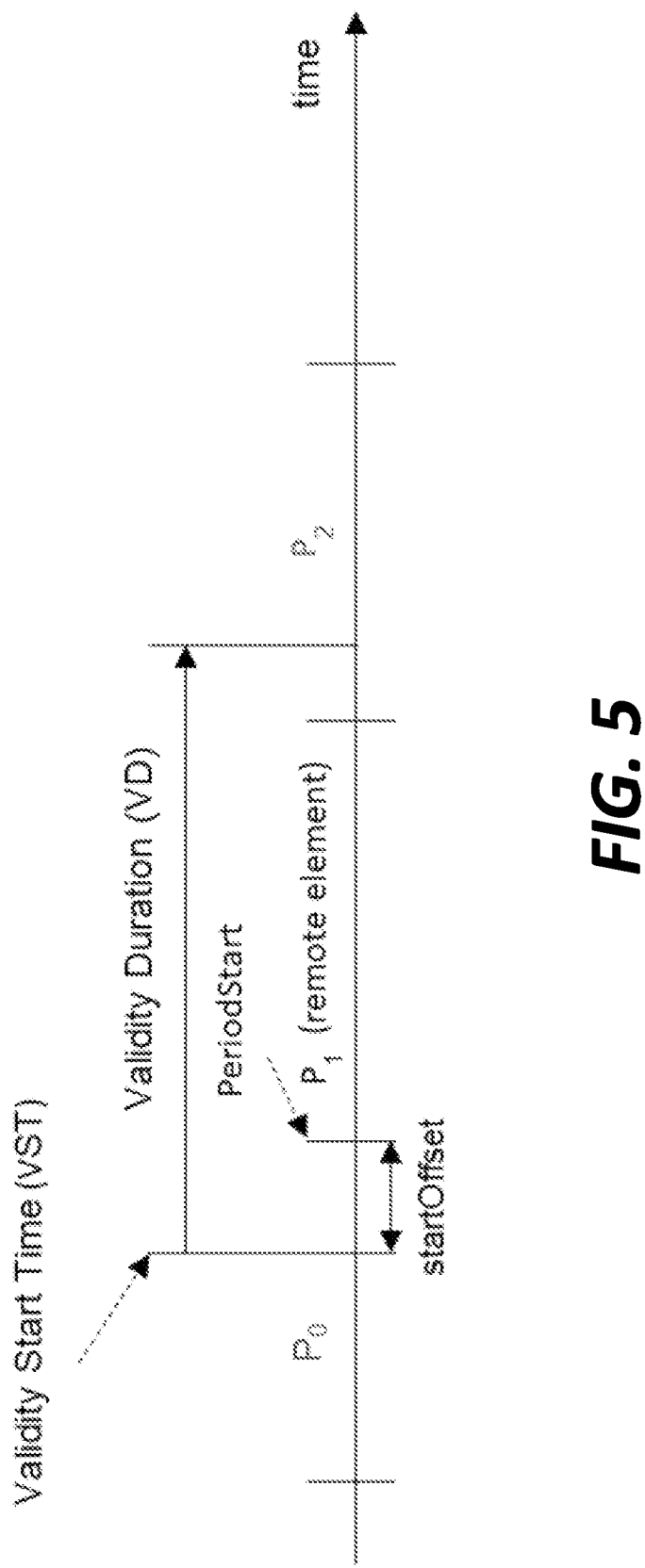
FIG. 5 shows an exemplary validity interval for a remote element according to an embodiment of the disclosure.

FIG. 5 shows an exemplary validity interval for a remote element according to an embodiment of the disclosure. In FIG. 5, a client (e.g., client (403)) receives a manifest such as an MPD including three periods P1, P2, and P3, in which P1 and P3 are explicit periods and P2 is a remote period. A hyperlink such as an XLink link used for P2 can include two variables startOffset and duration. Accordingly, the VST parameter and the VD parameter can be calculated as VST=PeriodStart−startOffset and VD=duration, respectively, where the variable PeriodStart is a start time of the period (e.g., P2) corresponding to the remote element.

When the current media presentation time of the client reaches the MPD time corresponding to the VST or any moment after that, the client can check whether a valid resolution of the remote element exists or not. If the resolution exists, the resolution can be valid in the validity interval, i.e., VST≤current time<VST+VD. However, if such a resolution does not exist, the client can resolve the remote element (again). It is noted that the VD parameter can be a certain number, a duration of a parent element of the remote element, or a duration of the MPD.

Table 2 shows an exemplary syntax table that supports a signaling of the validity interval of the remote element solution at a period level. In Table 2, the variable remoteLinkStartOffset can be an offset between the start time of the period corresponding to the remote element and the start time of the validity interval of the remote element resolution. Therefore, the variable remoteLinkStartOffset can indicate the earliest time to resolve the remote element. The variable remoteLinkDuration can be a duration of the validity interval of the remote element resolution. In an example, the variable remoteLinkDuration can be equal to −1, indicating that the duration of the validity interval can be valid till the end of the period. In another example, a default value of the variable remoteLinkDuration can be equal to INF (e.g., a largest integer), indicating that the duration of the validity interval can be valid until the end of the entire media presentation.

TABLE 2

| Element or Attribute Name | Use | Description |
| --- | --- | --- |
| Period |  | specifies the information of a Period. |
| @xlink:href | O | specifies a reference to a remote element entity that is either empty or contains one or multiple top-level elements of type Period. |
| @xlink:actuate | OD default: onRequest | specifies the processing instructions, which can be either "onLoad" or "onRequest". This attribute shall not be present if the @xlink:href attribute is not present. |

TABLE 2-continued

| Element or Attribute Name | Use | Description |
| --- | --- | --- |
| remoteLinkStartOffset | O | The negative offset from the PeriodStart, indicating the earliest time to resolve the xlink |
| remoteLinkDuration | O | The duration from the xlinkStartOffset in which the resolution of xlink stays valid.<br>A value of −1 means that the duration is valid until the Period end.<br>Default value is INF (largest integer) meaning the resolution is valid for the entire media presentation duration. |
| @id | O | specifies an identifier for this Period. The identifier shall be unique within the scope of the Media Presentation.<br>If the MPD@type is "dynamic", then this attribute shall be present and shall not change in case the MPD is updated.<br>If not present, no identifier for the Period is provided.<br>In case of a remote period element, every Period@id within the remote entity has to be unique within the media presentation. If the generator of the remote entity is unaware of the Period@id values used within the media presentation, it can use unique identifiers (such as UUIDs) as values for Period@id. If the xlink resolver maintains the same generated id for every client and for each time that the remote period is requested, the remote element is cacheable. |

In an embodiment, the start offset variable and the duration variable of the validity interval of the remote element resolution can be signaled by using an essential property descriptor or a supplemental property descriptor. For example, a descriptor can include three attributes: identification, schemeURI, and value. The schemeURI attribute can be used for signaling the remote element such as the XLink link. The value attribute can be used for the start offset variable and the duration variable. The values of the start offset variable and the duration variable can be separated by a space. The descriptor can be at various levels, such as an MPD level or a period level.

In addition, the same descriptor with the same schemeURI and without values can be used at an MPD level to signal an existence of such a descriptor for a validity interval of a remote element resolution, such that the client can be aware that a corresponding functionality is needed in order to play a media content correctly.

The start offset variable in the validity interval can provide the earliest time to resolve the remote element for the client, such that the client can avoid resolving the remote element earlier than the earliest time and obtaining a wrong result. In addition, the duration variable can provide the lifespan of the remote element resolution, such that the client can avoid resolving the same remote element multiple times. The validity interval can provide consistency in the playback of the media content, as the client only needs to resolve the remote element once during the validity interval. In a use-case, the validity interval can be set as a long duration in which case the client can play the identical media content each time when randomly accessing or replaying the remote element. In another use-case, the validity interval can be set as a short duration in which case the client can separately retrieve and play media contents each time when randomly accessing or replaying the remote element.

According to aspects of the disclosure, a valid lifespan of a remote element resolution can be built by including two properties into a link corresponding to the remote element. The two properties are start time and duration of the remote element resolution. A timing of the lifespan can be defined based on a media presentation timeline. The duration of the remote element resolution can be defined according to the duration of the parent element of the remote element. It is possible to define the duration property to be an infinite validity, a validity up to the duration of the parent element, or an explicit amount of duration. The start time property can be signaled by using an offset value from the start time of the parent element of the remote element. The property values can be signaled as new attributes of the parent element or as a descriptor such as an essential property descriptor or a supplement property descriptor. In addition, an existence of such properties can be signaled at an MPD level such that the client can realize that before parsing the period corresponding to the remote element, the client may need to support a functionality of obtaining the lifespan of the remote element resolution for the consistent playback of the media content corresponding to the remote element.

VI. Flowchart

Figure 6:
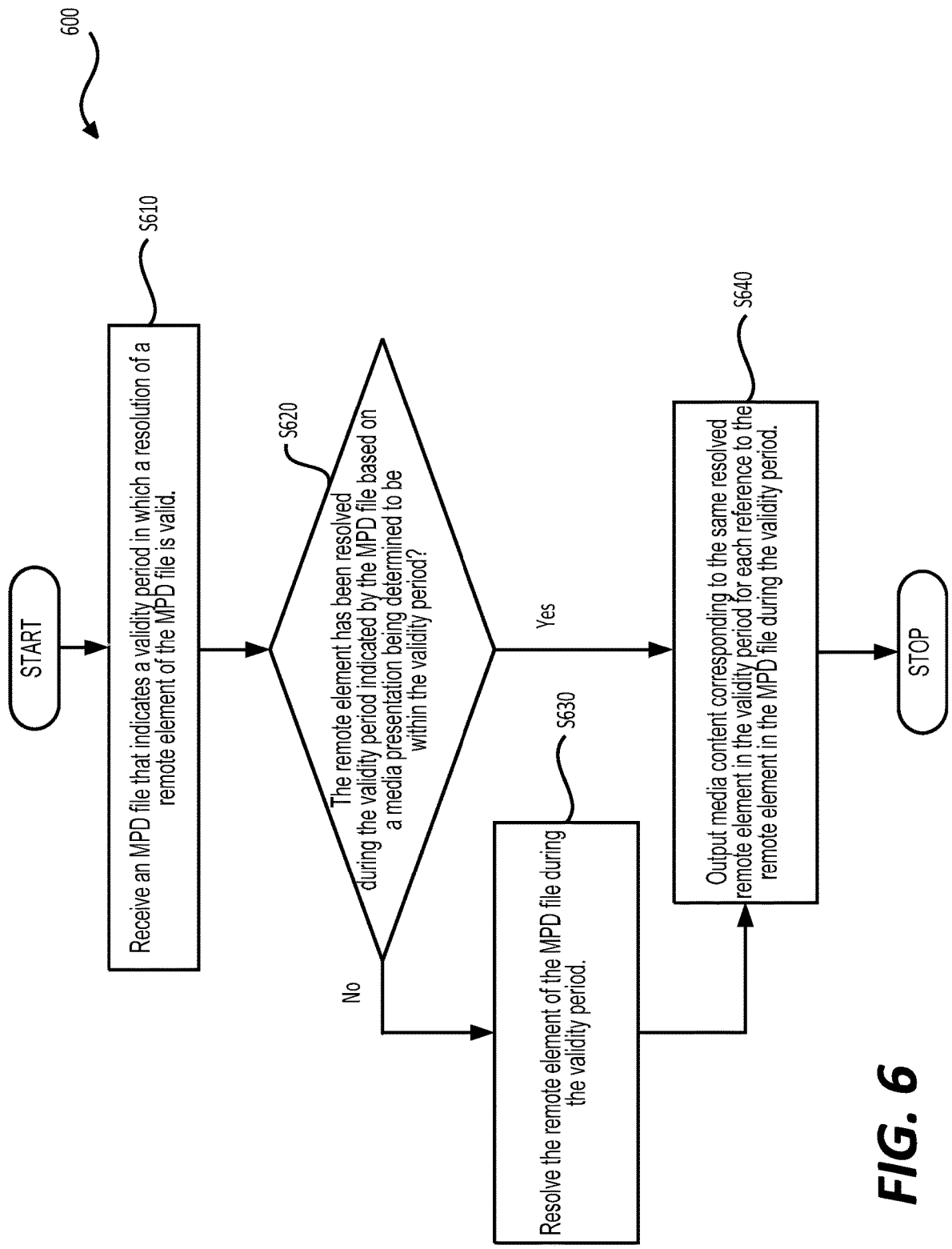
FIG. 6 shows a flow chart outlining a process example according to embodiments of the disclosure.

FIG. 6 shows a flow chart outlining a process (600) according to an embodiment of the disclosure. In various embodiments, the process (600) is executed by processing circuitry, such as the processing circuitry in the DASH client (102), the processing circuitry in the DASH access client (203), the processing circuitry in the SBD client (204), and the like. In some embodiments, the process (600) is implemented in software instructions, thus when the processing circuitry executes the software instructions, the processing circuitry performs the process (600). The process (600) starts at (S610), where the process (600) receives an MPD file that indicates a validity period in which a resolution of a remote element of the MPD file is valid. Then, the process (600) proceeds to step (S620).

At step (S620), the process (600) determines whether the remote element has been resolved during the validity period indicated by the MPD file based on a media presentation being determined to be within the validity period. When the remote element has not been resolved during the validity period, the process (600) proceeds to step (S630). Otherwise, the process (600) proceeds to step (S640).

At step (S630), the process (600) resolves the remote element of the MPD file during the validity period. Then, the process (600) proceeds to step (S640).

At step (S640), the process (600) outputs media content corresponding to the same resolved remote element in the validity period for each reference to the remote element in the MPD file during the validity period.

Then, the process (600) terminates.

In an embodiment, the MPD file includes a first parameter indicating a start time of the validity period and a second parameter indicating a duration of the validity period.

In an embodiment, the first parameter is an offset between the start time of the validity period and a start time of the media content corresponding to the remote element.

In an embodiment, the first parameter and the second parameter are included in one of a period element, an essential property descriptor, and a supplemental property descriptor included in the MPD file.

In an embodiment, the processing circuitry determines whether the remote element has been resolved during the validity period based on a hyperlink included in the MPD file corresponding to the remote element.

In an embodiment, the hyperlink is an extensible markup language linking language (XLink) link.

In an embodiment, a timeline of the validity period is a timeline of the MPD file.

VII. Computer System

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
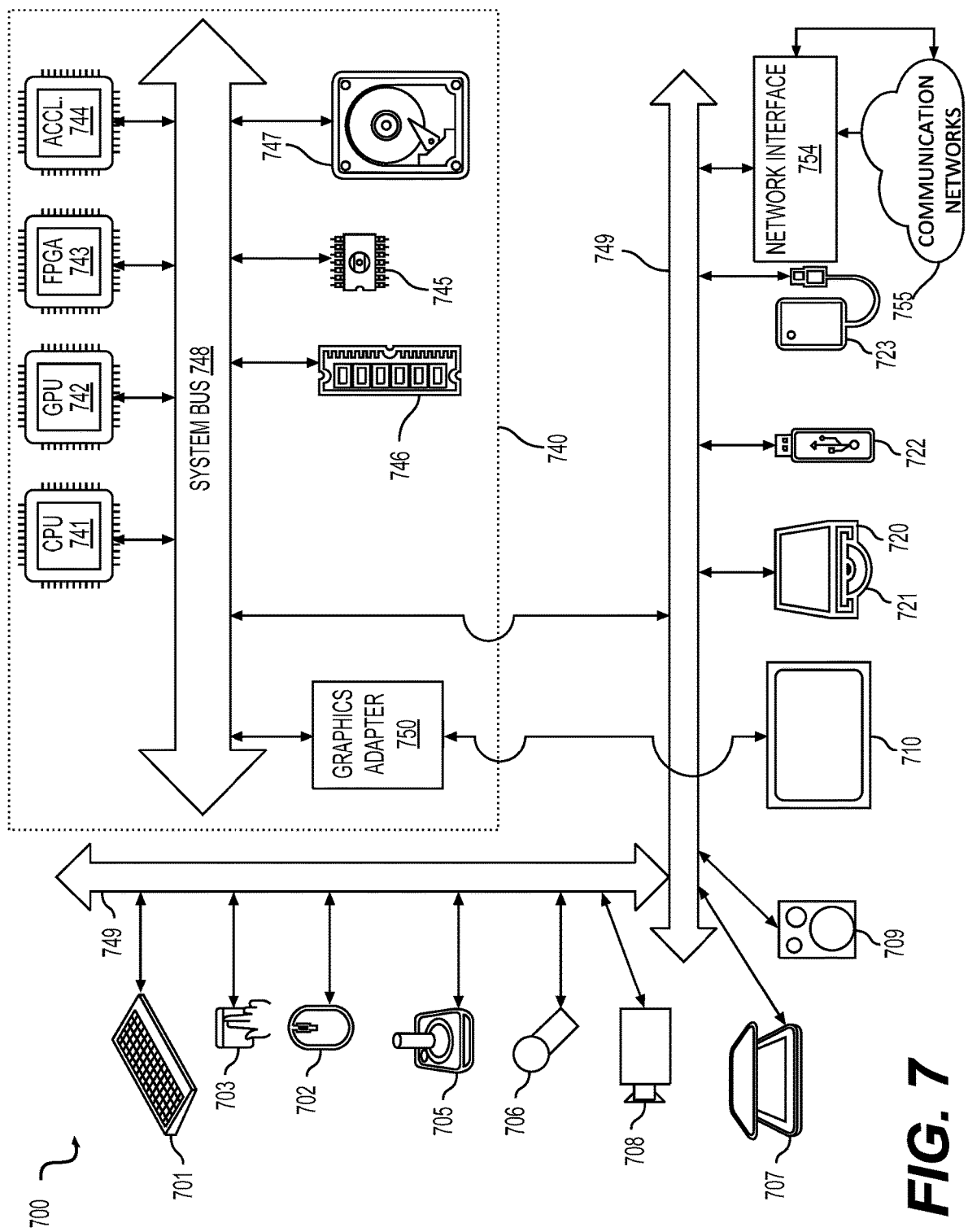
FIG. 7 is a schematic illustration of a computer system according to an embodiment of the disclosure.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), and camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (710)) can be connected to a system bus (748) through a graphics adapter (750).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include a network interface (754) to one or more communication networks (755). The one or more communication networks (755) can for example be wireless, wireline, optical. The one or more communication networks (755) can further be local, wide-area, metropolitan, vehicular and industrial, real-time, delay-tolerant, and so on. Examples of the one or more communication networks (755) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), and so forth. These devices, along with Read-only memory (ROM) (745), Random-access memory (746), internal mass storage (747) such as internal non-user accessible hard drives, SSDs, and the like, may be connected through the system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700) and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for receiving media content, the method comprising:
    receiving a media presentation description (MPD) file that indicates a duration of a validity period in which a resolution of a remote element of the MPD file is valid, the remote element being included in a remote period of the MPD file, the duration of the validity period being greater than a duration of the remote period such that the validity period ends after the remote period, wherein the MPD file indicates a start time of the validity period and the duration of the validity period;
    determining whether the remote element has been resolved during the validity period indicated by the MPD file based on a media presentation being determined to be within the validity period;
    resolving the remote element of the MPD file to obtain the resolution based on the remote element being determined not to be resolved in the validity period; and
    outputting, in the remote period, media content corresponding to the same resolution for each reference to the remote element of the MPD file during the validity period.

2. The method of claim 1, wherein the MPD file includes a first parameter indicating the start time of the validity period and a second parameter indicating the duration of the validity period.

3. The method of claim 2, wherein the first parameter is an offset between the start time of the validity period and a start time of the media content corresponding to the resolution.

4. The method of claim 2, wherein the first parameter and the second parameter are included in one of a period element, an essential property descriptor, or a supplemental property descriptor included in the MPD file.

5. The method of claim 1, wherein the determining further comprises:
    determining whether the remote element has been resolved during the validity period based on a hyperlink included in the MPD file corresponding to the remote element.

6. The method of claim 5, wherein the hyperlink is an extensible markup language linking language (XLink) link.

7. The method of claim 1, wherein a timeline of the validity period is a timeline of the MPD file.

8. An apparatus for receiving media content, the apparatus comprising:
    processing circuitry configured to
        receive a media presentation description (MPD) file that indicates a duration of a validity period in which a resolution of a remote element of the MPD file is valid, the remote element being included in a remote period of the MPD file, the duration of the validity period being greater than a duration of the remote period such that the validity period ends after the remote period, wherein the MPD file indicates a start time of the validity period and the duration of the validity period;

determine whether the remote element has been resolved during the validity period indicated by the MPD file based on a media presentation being determined to be within the validity period;

resolve the remote element of the MPD file to obtain the resolution based on the remote element being determined not to be resolved in the validity period; and output, in the remote period, media content corresponding to the same resolution for each reference to the remote element of the MPD file during the validity period.

9. The apparatus of claim 8, wherein the MPD file includes a first parameter indicating the start time of the validity period and a second parameter indicating the duration of the validity period.

10. The apparatus of claim 9, wherein the first parameter is an offset between the start time of the validity period and a start time of the media content corresponding to the resolution.

11. The apparatus of claim 9, wherein the first parameter and the second parameter are included in one of a period element, an essential property descriptor, or a supplemental property descriptor included in the MPD file.

12. The apparatus of claim 8, wherein the processing circuitry is further configured to:

determine whether the remote element has been resolved during the validity period based on a hyperlink included in the MPD file corresponding to the remote element.

13. The apparatus of claim 12, wherein the hyperlink is an extensible markup language linking language (XLink) link.

14. The apparatus of claim 8, wherein a timeline of the validity period is a timeline of the MPD file.

15. A non-transitory computer-readable storage medium storing instructions which when executed by a computer for receiving media content cause the computer to perform:

receiving a media presentation description (MPD) file that indicates a duration of a validity period in which a resolution of a remote element of the MPD file is valid, the remote element being included in a remote period of the MPD file, the duration of the validity period being greater than a duration of the remote period such that the validity period ends after the remote period, wherein the MPD file indicates a start time of the validity period and the duration of the validity period;

determining whether the remote element has been resolved during the validity period indicated by the MPD file based on a media presentation being determined to be within the validity period;

resolving the remote element of the MPD file to obtain the resolution based on the remote element being determined not to be resolved in the validity period; and outputting, in the remote period, media content corresponding to the same resolution for each reference to the remote element of the MPD file during the validity period.

16. The non-transitory computer-readable storage medium of claim 15, wherein the MPD file includes a first parameter indicating the start time of the validity period and a second parameter indicating the duration of the validity period.

17. The non-transitory computer-readable storage medium of claim 16, wherein the first parameter is an offset between the start time of the validity period and a start time of the media content corresponding to the resolution.

18. The non-transitory computer-readable storage medium of claim 16, wherein the first parameter and the second parameter are included in one of a period element, an essential property descriptor, or a supplemental property descriptor included in the MPD file.

19. The non-transitory computer-readable storage medium of claim 15, wherein the stored instructions cause the computer to perform:

determining whether the remote element has been resolved during the validity period based on a hyperlink included in the MPD file corresponding to the remote element.

20. The non-transitory computer-readable storage medium of claim 19, wherein the hyperlink is an extensible markup language linking language (XLink) link.

\* \* \* \* \*